United States Patent
Han et al.

(10) Patent No.: US 8,909,876 B2
(45) Date of Patent: Dec. 9, 2014

(54) SNAPSHOTS IN A HYBRID STORAGE DEVICE COMPRISING A MAGNETIC DISK AND A SOLID STATE DISK

(75) Inventors: Zhen Xing Han, Shanghai (CN); Scott Roy Murray, Shanghai (CN); Yi Tong, Shanghai (CN); Rong Zhang, Shanghai (CN); Xiao Qing Zhang, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 12/914,491

(22) Filed: Oct. 28, 2010

(65) Prior Publication Data

US 2012/0110287 A1    May 3, 2012

(51) Int. Cl.
*G06F 13/00* (2006.01)
*G06F 13/28* (2006.01)
*G06F 3/06* (2006.01)
*G06F 12/16* (2006.01)
*G06F 11/34* (2006.01)

(52) U.S. Cl.
CPC .............. *G06F 3/0617* (2013.01); *G06F 3/065* (2013.01); *G06F 12/16* (2013.01); *G06F 11/3485* (2013.01); *G06F 2201/81* (2013.01); *G06F 3/068* (2013.01)
USPC .................. 711/154; 711/162; 711/E12.002; 707/649

(58) Field of Classification Search
CPC ............................ G06F 3/0685; G06F 11/3485
USPC .................. 711/154, 162, E12.002; 707/649
See application file for complete search history.

(56) References Cited

U.S. PATENT DOCUMENTS

| | | | |
|---|---|---|---|
| 6,564,318 B1 * | 5/2003 | Gharda et al. ..................... | 713/2 |
| 7,571,293 B1 | 8/2009 | LeCrone et al. | |
| 7,716,183 B2 | 5/2010 | Lee | |
| 8,560,822 B1 * | 10/2013 | Chan et al. ........................ | 713/1 |
| 2003/0135350 A1 * | 7/2003 | Cheston et al. ............... | 702/186 |
| 2007/0156957 A1 * | 7/2007 | MacHardy et al. ........... | 711/114 |
| 2007/0250663 A1 | 10/2007 | Welsh et al. | |
| 2008/0052427 A1 * | 2/2008 | Levy ............................... | 710/62 |
| 2010/0023716 A1 | 1/2010 | Nemoto et al. | |
| 2010/0169281 A1 * | 7/2010 | Atluri et al. ................... | 707/641 |
| 2010/0281207 A1 * | 11/2010 | Miller et al. .................. | 711/103 |
| 2010/0281230 A1 * | 11/2010 | Rabii et al. ..................... | 711/165 |
| 2012/0102281 A1 * | 4/2012 | Moon et al. .................... | 711/162 |

\* cited by examiner

*Primary Examiner* — Edward Dudek, Jr.
(74) *Attorney, Agent, or Firm* — Rabindranath Dutta; Konrad Raynes Davda & Victor LLP

(57) ABSTRACT

One or more snapshots of data stored over a period of time are maintained in a hybrid storage device comprising a magnetic disk and a solid state disk, wherein a selected snapshot stores information that allows recovery of data that is stored in the hybrid storage device at a selected point in time of the period of time. The hybrid storage device receives an input/output (I/O) command from a computational device. A category of a plurality of categories to which the I/O command belongs is determined, wherein the plurality of categories comprise writing to an unused block, writing to a used block, reading from an unused block, and reading from a used block. In response to determining the category to which the I/O command belongs, the I/O command is handled by one of the magnetic disk and the solid state disk based on the determined category.

18 Claims, 7 Drawing Sheets

SNAPSHOTS IN A HYBRID STORAGE DEVICE COMPRISING A MAGNETIC DISK AND A SOLID STATE DISK

BACKGROUND

1. Field

The disclosure relates to a method, a system, and a computer program product for snapshots in a hybrid storage device comprising a magnetic disk and a solid state disk.

2. Background

Backup of data may be performed in certain computer storage systems. In certain situations, high efficiency backups may be performed by using "copy on write" technology that provides a snapshot of a storage system at a point in time. Snapshots that allow the recovery of the state of a storage system at particular points in time may be performed in certain server-based storage system or in certain snapshot-capable file systems. Snapshot mechanisms may primarily be used in enterprise systems.

In contrast to enterprise systems, in certain products used by consumers, direct attached storage and snapshot-incapable file systems may be used. In such products that are used by consumers, the capability of snapshot-based backup may not be found. Many consumers may rarely, if ever, perform backups because mechanisms for backup may be inconvenient or time consuming.

SUMMARY OF THE PREFERRED EMBODIMENTS

Provided are a method, a system, and a computer program product in which one or more snapshots of data stored over a period of time are maintained in a hybrid storage device comprising a magnetic disk and a solid state disk, wherein a selected snapshot stores information that allows recovery of data that is stored in the hybrid storage device at a selected point in time of the period of time. The hybrid storage device receives an input/output (I/O) command from a computational device. A category of a plurality of categories to which the I/O command belongs is determined, wherein the plurality of categories comprise writing to an unused block, writing to a used block, reading from an unused block, and reading from a used block. In response to determining the category to which the I/O command belongs, the I/O command is handled by one of the magnetic disk and the solid state disk based on the determined category.

In additional embodiments, a determination is made that a first snapshot taken at a first point in time exists on the magnetic disk and that a second snapshot at a second point in time is to be generated. The second snapshot at the second point in time is generated. The second snapshot is stored on the solid state disk, wherein the second snapshot stores changes that have taken place since the first snapshot taken at the first point in time.

In further embodiments, the handling of the I/O command by one of the magnetic disk and the solid state disk based on the determined category further comprises handling the I/O command via the magnetic disk, in response to determining that the category is writing to an unused block, and in response to determining that the category is writing to a used block, handling the I/O command via the solid state disk.

In additional embodiments, the handling of the I/O command by one of the magnetic disk and the solid state disk based on the determined category further comprises, performing in response to determining that the category is reading from a used block: (i) determining whether the used block is on the magnetic disk or on the solid state disk; (ii) in response to determining that the used block is on the magnetic disk, handling the I/O command via the magnetic disk; and (iii) in response to determining that the used block is on the solid state disk, handling the I/O command via the solid state disk. Additionally, in response to determining that the category is reading from an unused block, a predetermined fixed response is returned to the computational device. In further embodiments, the one or more snapshots comprise a first snapshot stored in the magnetic disk and incremental snapshots taken subsequent to the first snapshot stored in the solid state disk, and wherein all data that is changed is maintained in the solid state disk. Furthermore, in response to determining that free space on the solid state disk is less than a predetermined threshold a plurality of snapshots are coalesced to free up space on the solid state disk. Also, in response to determining that an incremental snapshot stored in the solid state disk is to be merged with the first snapshot stored in the magnetic disk, all blocks in the incremental snapshot stored in the solid state disk are copied onto the magnetic disk to overwrite oldest blocks present in the magnetic disk.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments provide a snapshot mechanism within a hybrid storage device comprising a magnetic disk and a solid state disk that are interfaced and housed within the hybrid storage device. The snapshot mechanism is implemented within the hybrid device, and software that exists within a computational device to interact with the hybrid storage device does not have to be modified to implement the snapshot mechanism.

Exemplary Embodiments

Figure 1:
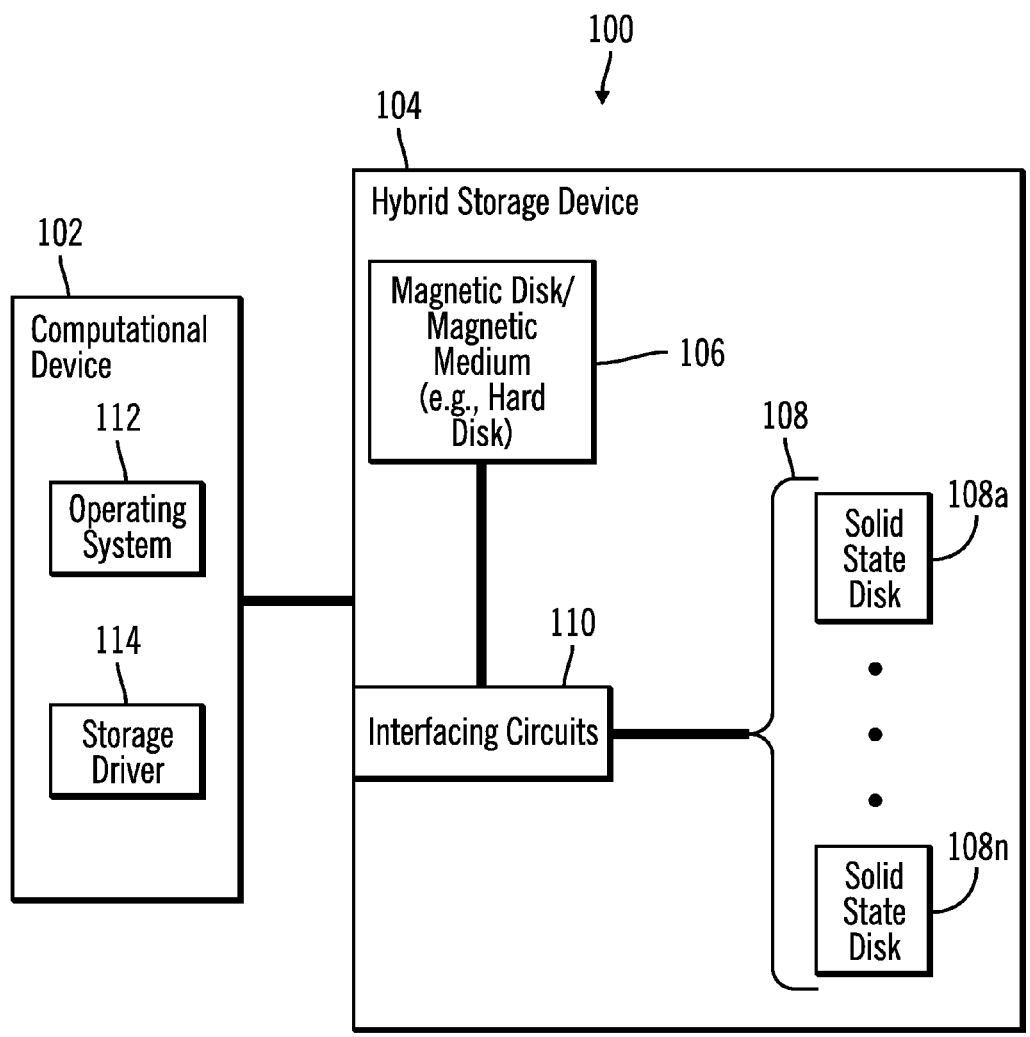
FIG. 1 illustrates a block diagram of a computing environment that includes a computational device coupled to a hybrid storage device, in accordance with certain embodiments.

FIG. 1 illustrates a block diagram of a computing environment 100 that includes a computational device 102 coupled to hybrid storage device 104, in accordance with certain embodiments. The computational device 102 may be any suitable device including those presently known in the art, such as, a personal computer, a workstation, a server, a mainframe, a hand held computer, a palm top computer, a telephony device, a network appliance, a blade computer, a storage server, a storage controller, etc. The hybrid storage device 104 may comprise a magnetic disk 106 and one or more solid state disks 108a . . . 108n (also referred to via reference numeral 108) coupled via interfacing circuits 110. The interfacing circuits 110 may also translate Input/Output (I/O) requests from the computational device 102 to corresponding movement in spindle motor and disk heads housed within the hybrid storage device 104. In certain embodiments the hybrid storage device 104 may be implemented in a housing that is in the form factor of a hard disk drive, wherein the magnetic disk 106, such as a hard disk, and the plurality of solid state disks 108a . . . 108n are maintained within the housing. While FIG. 1 shows more than one solid state disks, in certain embodiments a single solid state disk may be maintained in the hybrid storage device 104.

The coupling of the computational device 102 to the hybrid storage device 104, may be via a network, wherein the network may be any network known in the art, such as the Internet, an intranet, a Local area network (LAN), a Storage area network (SAN), a Wide area network (WAN), a wireless network, etc. The computational device 102 may alternatively be connected to the hybrid storage device without a network, such as through direct lines, common bus systems, etc., in a manner known in the art. Also the network may be part of one or more larger networks or may be an independent network or may be comprised of multiple interconnected networks. In certain embodiments, the computational device 102 and the hybrid storage device 104 of FIG. 1 may be a cloud component part included in a cloud computing environment.

In certain embodiments, the computational device 102 may have an operating system 112 and a storage driver 114 implemented within the computational device 102. In storage driver 114 may be software that allows the hybrid storage device 104 to interact with the operating system 112 of the computational device 102.

In certain embodiments, snapshots that indicate the state of the hybrid storage device 104 at selected points in time may be maintained within the magnetic disk 106 and the solid state disks 108a . . . 108n. For example, in certain embodiments, the magnetic disk 106 may store a base snapshot that includes indications of the files stored in the hybrid storage device 104 at 10 AM, and the solid state disks 108a . . . 108n may store an additional snapshot that includes indications of the files stored in the hybrid storage device 104 at 10:30 AM. The additional snapshot may store indications of the files that have changed since the base snapshot was taken at 10 AM.

Figure 2:
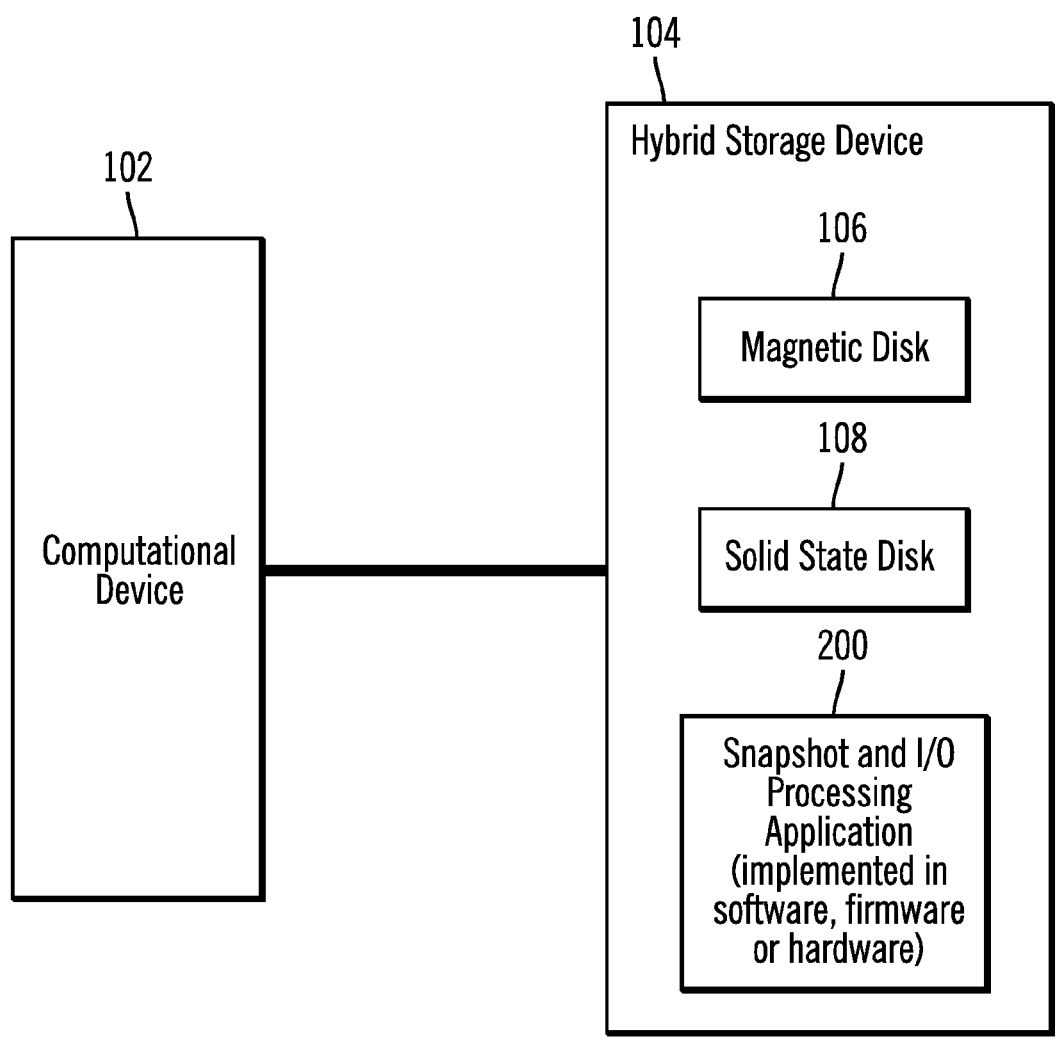
FIG. 2 illustrates a block diagram that shows an exemplary computational device coupled to a hybrid storage device having a magnetic disk, a solid state disk, and an application, in accordance with certain embodiments.

FIG. 2 illustrates a block diagram that shows the exemplary computational device 102 coupled to the hybrid storage device 104 having an exemplary magnetic disk 106 and an exemplary solid state disk 108, in accordance with certain embodiments. In additional to the magnetic disk 106 and the solid state disk 108, a snapshot and Input/Output (I/O) processing application 200 may be implemented within the hybrid storage device 104, wherein the snapshot and I/O processing application 200 may be implemented in hardware, software, or firmware or any combination thereof.

In certain embodiments, the snapshot and I/O processing application 200 may at particular instants (i.e., points) of time generate snapshots of the hybrid storage device 104 without any intervention from the computational device 102. Additionally, the snapshot and I/O processing application 200 may also receive I/O commands from the computational device 102 and execute the I/O commands within the hybrid storage device 104.

Figure 3:
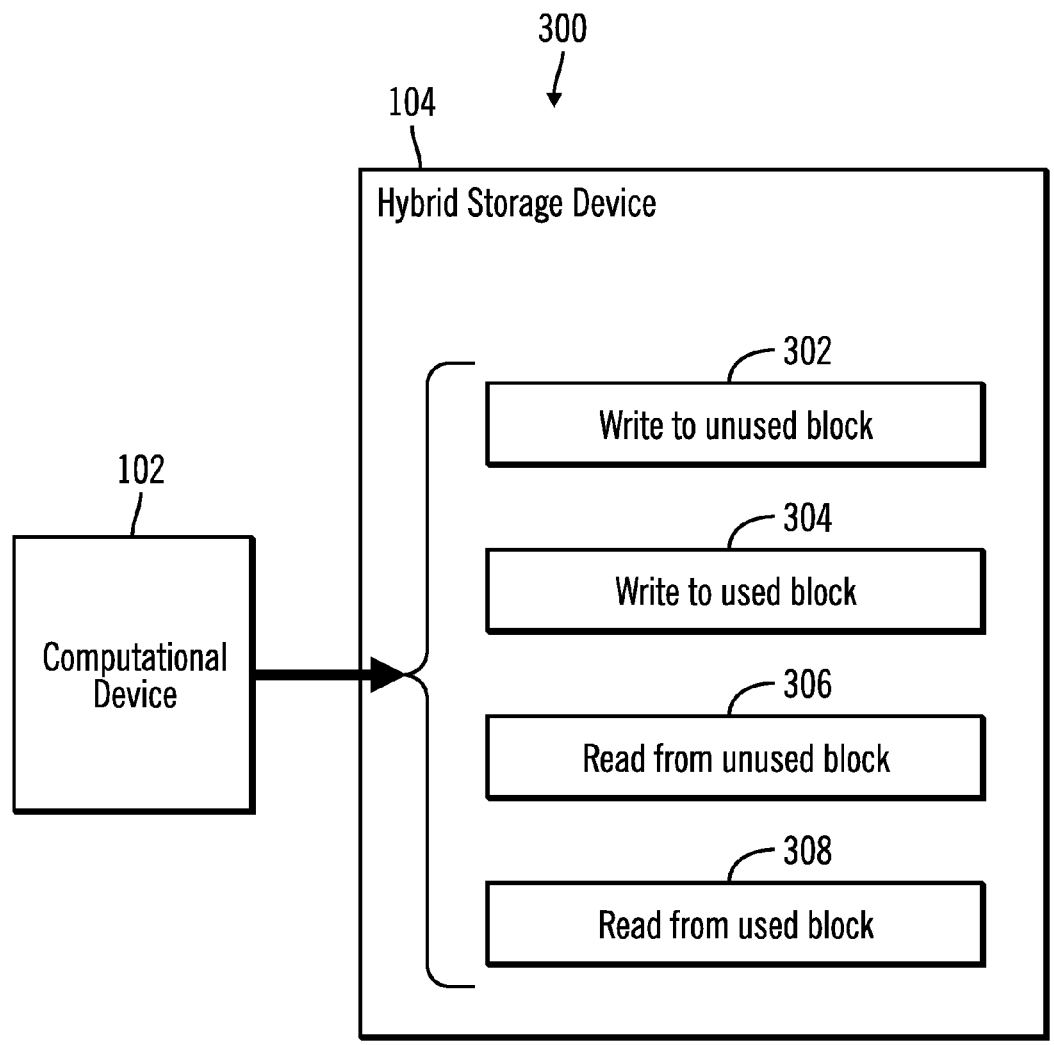
FIG. 3 illustrates a block diagram that shows how the hybrid storage device interprets read and write requests from the computational device, in accordance with certain embodiments.

FIG. 3 illustrates a block diagram 300 that shows how the hybrid storage device 104 interprets read and write requests from the computational device 102, in accordance with certain embodiments.

In certain embodiments, data may be stored in the hybrid storage device 104 in blocks, wherein a block may comprise any fixed length of data. For example, in certain embodiments a block may be 512 bytes.

Initially, all of the blocks on the hybrid storage device 104 may be unused. A used block is a block on which data has been written. In certain embodiments, I/O requests from the computational device 102 to the hybrid storage device 104 are of four categories:
(i) Write to unused blocks (shown via reference numeral 302);
(ii) Write to used block (shown via reference numeral 304);
(iii) Read from unused block (shown via reference numeral 306); and
(iv) Read from used block (shown via reference numeral 308).

In certain embodiments, the snapshot and I/O processing application 200 that executes on the hybrid storage device 104 interprets the I/O requests of the four different categories and responds to the computational device 102.

Figure 4:
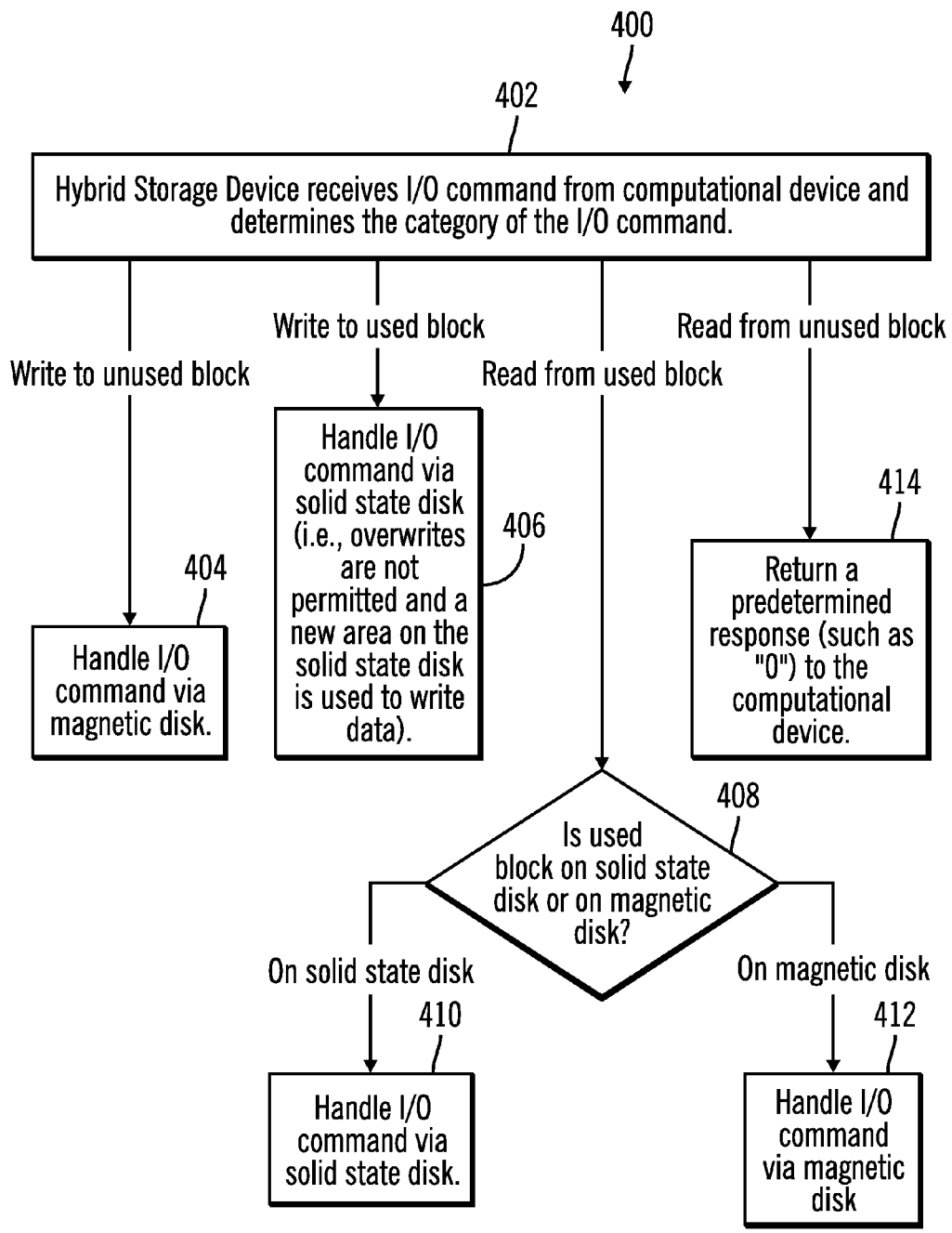
FIG. 4 illustrates a flowchart that shows how read and write operations may be performed with respect to used and unused blocks of the hybrid storage device, in accordance with certain embodiments.

FIG. 4 illustrates a flowchart 400 that shows how read and write operations may be performed with respect to used and unused blocks of the hybrid storage device 104, in accordance with certain embodiments. The operations shown in FIG. 4 may be implemented via the snapshot and I/O processing application 200 that executes on the hybrid storage device 104.

Control starts at block 402 in which the hybrid storage device 104 receives an I/O command from the computational device 102 and determines the category of the I/O command.

If the category of the I/O command is write to unused block (i.e., the I/O command is a request to write to an unused block of the hybrid storage device 104) then the snapshot and I/O processing application 200 of the hybrid storage device 104 handles (at block 404) the I/O command via the magnetic disk 106 of the hybrid storage device 104, and as a result data is written to the magnetic disk 106.

If the category of the I/O command is write to used block (i.e., the I/O command is a request to write to a used block of the hybrid storage device 104) then the snapshot and I/O processing application 200 of the hybrid storage device 104 handles (at block 406) the I/O command via the solid state disk 108 of the hybrid storage device 104 and as a result data is written to the solid state disk 108.

If the category of the I/O command is read from used block (i.e., the I/O command is a request to read from a used block of the hybrid storage device 104) then the snapshot and I/O processing application 200 determines (at block 408) whether the used block of the hybrid storage device 104 is on the solid state disk 108 or on the magnetic disk 106. If the used block is on the solid state disk 108 then the snapshot and I/O processing application 200 of the hybrid storage device 104 handles (at block 410) the I./O command via the solid state disk 108 of the hybrid storage device 104 and as a result data is read from the solid state disk 108. However, if the used block is on the magnetic disk 106 then the snapshot and I/O processing application 200 of the hybrid storage device 104 handles (at block 412) the I./O command via the magnetic disk 106 of the hybrid storage device 104 and as a result data is read from the magnetic disk 106

If the category of the I/O command is read from an unused block (i.e., the I/O command is a request to read from an unused block of the hybrid storage device 104) then the snapshot and I/O processing application 200 of the hybrid storage device 104 returns (at block 414) a predetermined response (such as "0") to the computational device 102 to indicate that data cannot be read from an unused block.

Therefore, FIG. 4 illustrates certain embodiments that show how the hybrid storage device 104 that stores snapshots responds to various categories of I/O requests received from the computational device 102. It should be noted that previously written blocks on the magnetic disk 106 remains unchanged.

Figure 5:
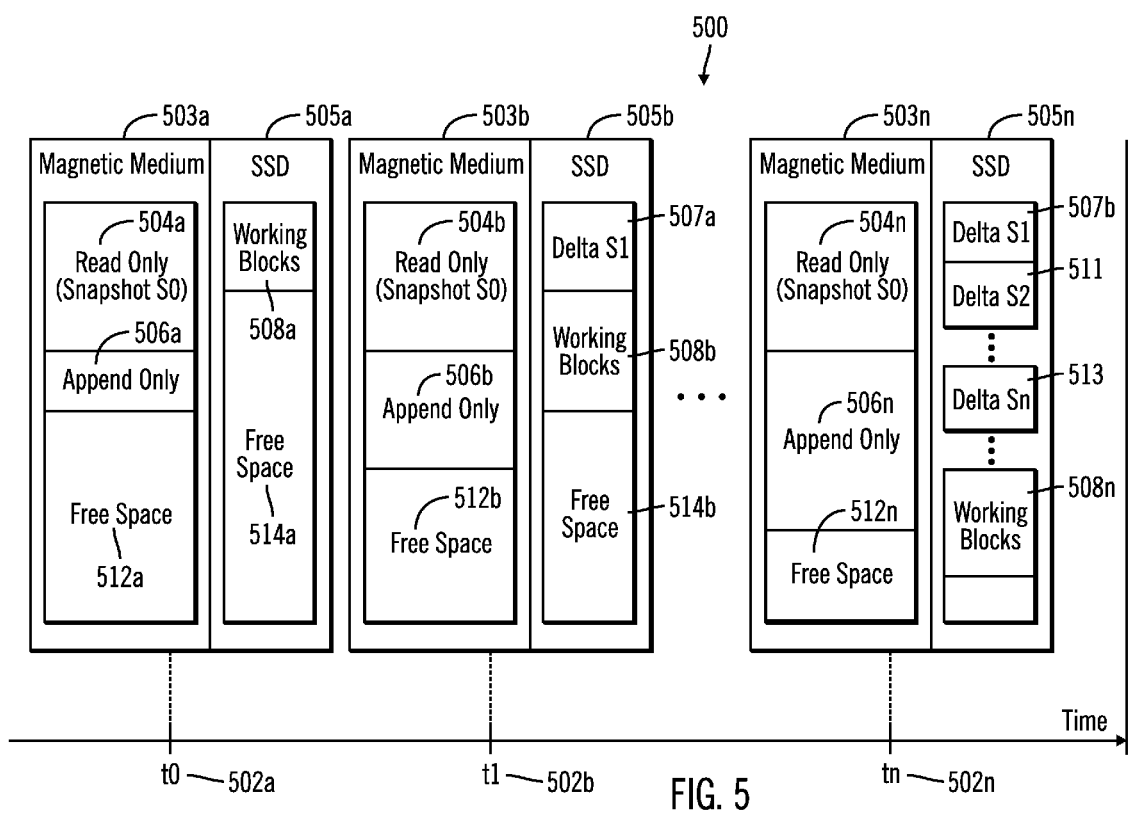
FIG. 5 illustrates a block diagram that shows how data and snapshots are stored in the magnetic medium of the magnetic disk and the solid state disk, in accordance with certain embodiments.

FIG. 5 illustrates a block diagram 500 that shows how data is stored in the magnetic medium of the magnetic disk 106, and in the solid state disk 108 at selected points in time (e.g., point in time, t0, referred to by reference numeral 502a, point in time, t1, referred to by reference numeral 502b, point in time, tn, referred to by reference numeral 502n), in accordance with certain embodiments.

FIG. 5 shows an initial snapshot S0 (reference numerals 504a, 504b, 504n) that is maintained in the magnetic medium 503a, 503b, 503n of the magnetic disk 106. The initial snapshot S0 (reference numeral 504a) that is created at point in time t0 (reference numeral 502) remains unchanged at points in time t1 (reference numeral 502a) and tn (reference numeral 502n). It should be noted that in the operations shown in FIG. 4, when I/O commands to write data on used blocks were received by the hybrid storage device 104, data was written to the solid state disk (SSD) 108 (shown as reference numerals 505a, 505b, 505n). When an I/O command is received by the hybrid storage device 104 to write to an unused block, data is appended to the magnetic medium 503a, 503b, 503n, as shown by the expanding append only region (reference numerals 506a, 506b, 506n) of the magnetic medium 503a, 503b, 503n.

If at point in time t1 (reference numeral 502b), a new snapshot is needed, any existing blocks on the solid state disk 505b is preserved, and subsequent write requests to used blocks are written to new positions on the solid state disk 505b in the working blocks region (508b). The new snapshot delta S1 (reference numeral 507a) indicates the files that have changed since the taking of the snapshot S0 (reference numeral 504a, 504b) via a bitmap or some other data structure. To recover the state of the system to point in time t1 (reference numeral 502b), the delta S1 (reference numeral 507a) snapshot and the snapshot S0 (reference numeral 504b) may be used. At various points in time additional incremental snapshots shown as delta S2 (reference numerals 511), delta Sn (reference numeral 513) may be generated. Each incremental snapshot stores differences in files from the immediately previous snapshot. As a result, to recover the state of the hybrid storage system 104 at point in time to (reference numeral 502n) the snapshot S0 504n stored in the magnetic medium 503n and the incremental snapshots 507b, 511, . . . , 513 shown in the solid state disk 504n may be used.

FIG. 5 also shows the working block regions 508a, 508b, 508n of the solid state disk at various points in time. The free space 512a, 512b, 512n in the magnetic disk may be reduced over time and the free space 514a, 514b on the solid state disk 108 may also be reduced over time. Eventually, the solid state disk 108 may run out of space. To free up space, snapshots may be coalesced. For example, in certain embodiments coalescence of exemplary snapshots S_c and S_c+1 are desired, wherein both snapshots are stored on the solid state disk. These two snapshots have their own set of changed blocks stored on the solid state disk and new blocks stored on the magnetic disk. To coalesce, the overlapped changed blocks only have the newer copies from S_c+1 preserved, and the copies from S_c are discarded. Any other blocks get preserved. A special type of coalescence takes place when snapshot S0 504b is coalesced. All the blocks on delta 51 507a are copied onto magnetic disk to overwrite the oldest blocks.

In certain embodiments, starting with an initial, empty snapshot, S0, only new blocks are created, and existing blocks are not modified. In this case, all the new blocks may be stored on the magnetic disk as the new blocks do not change the used blocks. The file system however does change to reflect new files. So the snapshots on the solid state disk 108 may include only file system changes, which are often relatively small. There may be adequate free space on a solid state disk to store the file system changes if the solid state disk is large as a proportion of the magnetic disk. In certain embodiments, changes other than file system changes may be stored in the snapshots. For example, in systems that do not have any file system the changes stored in the snapshots are not file system changes.

In other embodiments, starting with a full initial snapshot S0, only existing blocks are changed. All the changes may be stored on the solid state disk. The solid state disk may soon run out of space. Old snapshots are then coalesced to free up space. To prevent the situation where space can be exhausted, a predetermined threshold for solid state device space usage may be set. If a user continues changing data, even after crossing the threshold, the hybrid storage device 104 may coalesce the oldest snapshot, S0, in order to continue. If coalescing S0 does not free sufficient space, then snapshots S1, S2, and so on, may also be coalesced. In the worst case, this forced action may last until all the snapshots on the solid state disk are coalesced, whereupon, all four categories of I/O request may be handled by the magnetic disk. The hybrid storage device 104 may then operate in the same way as a conventional hard disk drive. Such embodiments guarantee that a user will not lose the latest changes, even if all of the previous snapshots are coalesced. This is no worse than a conventional hard disk drive.

Ordinarily, average usage may fall somewhere between the two extreme cases described above. Some users may tend to create new block relatively more in comparison to modifying existing blocks. For example, operating systems software and other applications, multi-media files, etc remain relatively unchanged.

Although the system or software using the hybrid storage device 104 is unaware of the snapshot function, there may still be a need for snapshot management software. So, there may have to be some mechanism for the user to manage the enhanced, or hybrid storage device 104. This can be achieved in certain embodiments through specific driver software, either implemented under Basic Input-Output System (BIOS)/Extensible Firmware Interface (EFI), or in the operating system. It is possible to have specific drivers for all major operating systems, but handling under BIOS/EFI causes certain embodiments to be much simpler. The management of snapshots, including creation, deletion, coalescence and reversion can all be provided through software, independently of the operating system. The management software may reside in a hidden partition of the magnetic disk, and may be loaded prior to operating system start-up by BIOS or EFI. Once the management job is complete, it can chain-load the operating system, and make itself invisible thereafter. Using this method, neither the BIOS/EFI nor the operating may need any modification.

In certain embodiments, an operating system restart may be needed to permit snapshot management. If a user needs online snapshot administration, device drivers may be loaded into the operating system to meet this requirement.

Figure 6:
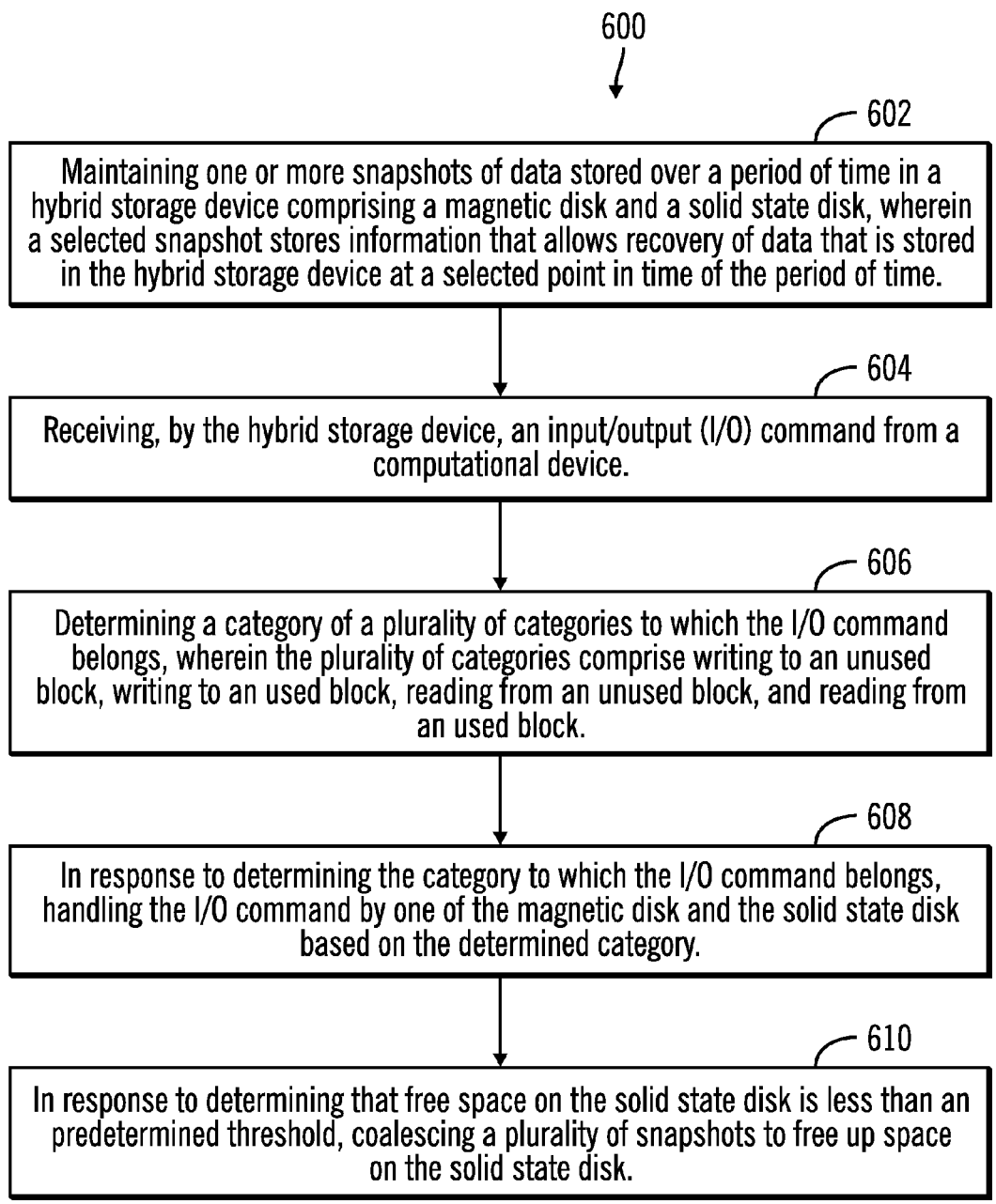
FIG. 6 illustrates a flowchart that shows operations performed in the computing environment of FIG. 1, in accordance with certain embodiments.

FIG. 6 illustrates a flowchart 600 that shows operations performed in the computing environment 100 of FIG. 1, in accordance with certain embodiments. The operations shown in flowchart 600 may be performed by the snapshot and I/O processing application 200 implemented in the hybrid storage device 104.

Control starts at block 602, in which one or more snapshots of data stored over a period of time are maintained in a hybrid storage device 104 comprising a magnetic disk 106 and a solid state disk 108, wherein a selected snapshot stores information that allows recovery of data that is stored in the hybrid storage device 104 at a selected point in time of the period of time.

The hybrid storage device 104 receives (at block 604) an input/output (I/O) command from a computational device 102. A category of a plurality of categories 302, 304, 306, 308 to which the I/O command belongs is determined (at block 606), wherein the plurality of categories comprise writing to an unused block 302, writing to a used block 304, reading from an unused block 306, and reading from a used block 308. In response to determining the category to which the I/O command belongs, the I/O command is handled (at block 608) by one of the magnetic disk 104 and the solid state disk 106 based on the determined category.

Control proceeds to block 610, wherein in response to determining that free space on the solid state disk 106 is less than an predetermined threshold, plurality of snapshots are coalesced to free up space on the solid state disk.

Therefore, FIGS. 1-6 illustrate certain embodiments in which the hybrid storage device 104 provides a snapshot mechanism that uses both solid state disks and copy-on-write technologies. The operating system may need no modifications to the existing driver software. There is little or no knowledge of the snapshot technology mechanism storage needed by the users as the snapshot technology mechanisms are implemented in certain embodiments within the hybrid storage device 104. The implementation costs may be low in comparison to enterprise solutions In certain embodiments, the performance of magnetic disks may degrade if the I/O request involves blocks that are not contiguous. For this reason, the magnetic disks may require defragmentation. Fragmentation occurs when data is changed. By storing all changed data on solid state disks rather than on disk, the data on disk remains contiguous, and improves performance.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

* Java is a trademark or registered trademark of Sun Microsystems, Inc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
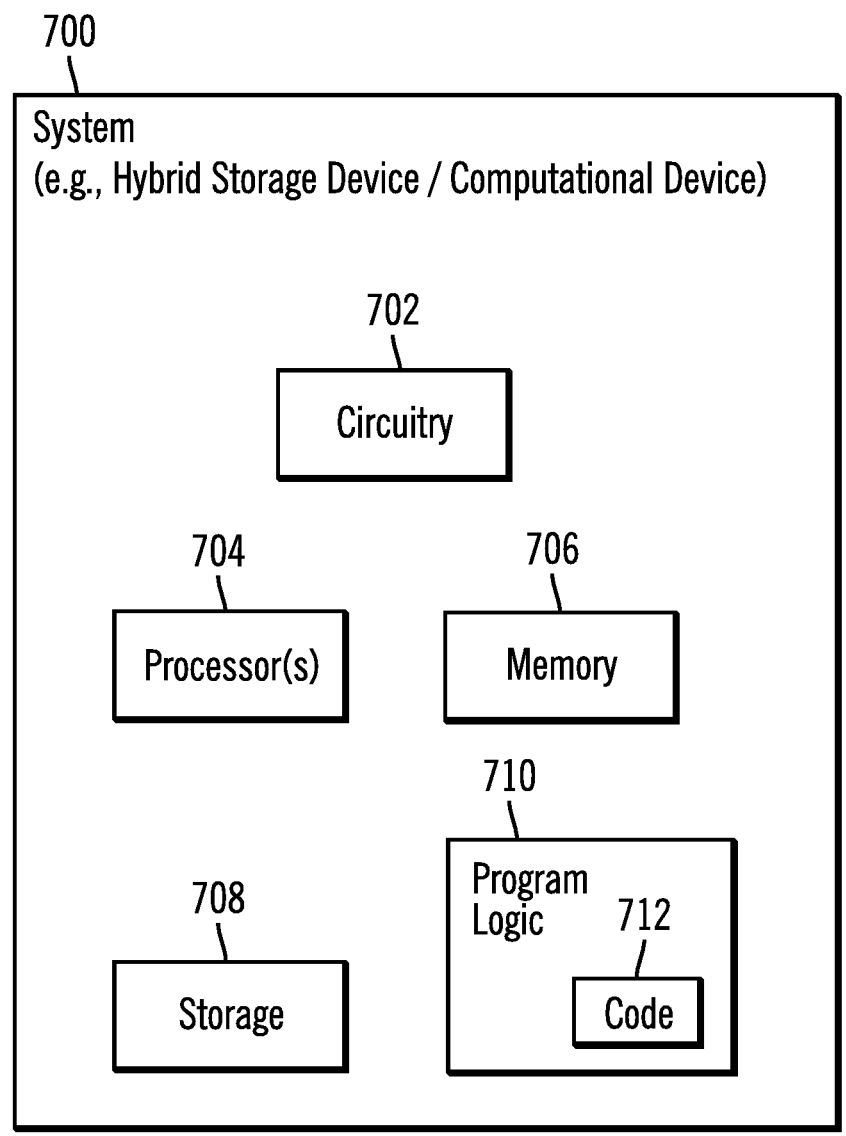
FIG. 7 illustrates a block diagram of a computational system that shows certain elements that may be included in the hybrid storage device of FIG. 1, in accordance with certain embodiments.

FIG. 7 illustrates a block diagram that shows certain elements that may be included in the system 700 in accordance with certain embodiments. The system 700 may comprise the hybrid storage device 104 and may include a circuitry 702 that may in certain embodiments include at least a processor 704. The system 700 may also include a memory 706 (e.g., a volatile memory device), and storage 708. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

In certain embodiments, the computational device 102 and the hybrid storage device 104 of FIG. 1 may be cloud component parts included in a cloud computing environment. In the cloud computing environment the systems architecture of the hardware and software components involved in the delivery of cloud computing may involve a plurality of cloud components communicating with each other. For example, in certain embodiments, the computational device 102 of FIG. 1 may provide clients, and other servers and software and/or hardware components in the networked cloud with storage and data processing services. The computational device 102 may provide reliable storage services and access to the hybrid storage device 104 to meet quality of service requirements for customers in the cloud. The computational device 102 may communicate with clients to provide storage and other services for the storage devices 104 through a web interface or other application programming interface.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
maintaining one or more snapshots of data stored over a period of time in a hybrid storage device comprising a magnetic disk and a solid state disk, wherein the magnetic disk and the solid state disk are maintained within a single housing that implements the hybrid storage device, and wherein a selected snapshot stores information that allows recovery of data that is stored in the hybrid storage device at a selected point in time of the period of time;
receiving, by the hybrid storage device, an input/output (I/O) command from a computational device;
determining, by an application that executes in software, firmware, or hardware maintained within the single housing that implements the hybrid storage device, a category of a plurality of categories to which the I/O command received from the computational device belongs, wherein the plurality of categories comprise writing to an unused block, writing to a used block, reading from an unused block, and reading from a used block, and wherein the used block is a block on which data has been written;
in response to determining by the application executing in the hybrid storage device the category to which the I/O command received from the computational device belongs, handling the I/O command by one of the magnetic disk and the solid state disk based on the determined category; and
in response to determining that an incremental snapshot stored in the solid state disk is to be merged with a first snapshot stored in the magnetic disk, all blocks in the incremental snapshot stored in the solid state disk are copied onto the magnetic disk to overwrite oldest blocks present in the magnetic disk, wherein:
management of snapshots is provided by a management software that resides in a hidden partition of the magnetic disk and is loaded prior to operating system startup by Extensible Firmware Interface or Basic Input-Output System, and once the management of snapshots is complete the operating system is loaded.

2. The method of claim 1, the method further comprising:
determining that a first snapshot taken at a first point in time exists on the magnetic disk and that a second snapshot at a second point in time is to be generated; and
generating the second snapshot at the second point in time; and
storing the second snapshot on the solid state disk, wherein the second snapshot stores changes that have taken place since the first snapshot taken at the first point in time.

3. The method of claim 2, wherein the handling of the I/O command by one of the magnetic disk and the solid state disk based on the determined category further comprises:
in response to determining that the category is writing to an unused block, handling the I/O command via the magnetic disk; and
in response to determining that the category is writing to a used block, handling the I/O command via the solid state disk.

4. The method of claim 2, wherein the handling of the I/O command by one of the magnetic disk and the solid state disk based on the determined category further comprises:
in response to determining that the category is reading from a used block, performing:
(i) determining whether the used block is on the magnetic disk or on the solid state disk;
(ii) in response to determining that the used block is on the magnetic disk, handling the I/O command via the magnetic disk; and
(iii) in response to determining that the used block is on the solid state disk, handling the I/O command via the solid state disk; and
in response to determining that the category is reading from an unused block, returning a predetermined fixed response to the computational device.

5. The method of claim 1, wherein the EFI or the BIOS remains unmodified to support the management of snapshots.

6. The method of claim 5, wherein software that exists in the computational device to interact with the hybrid storage device remains unmodified to support the management of snapshots.

7. A hybrid storage device having a magnetic disk and a solid state disk, wherein the hybrid storage device is coupled to a computational device, and wherein the hybrid storage device comprises:
a memory; and
a processor coupled to the memory, wherein the processor performs operations, the operations comprising:
maintaining one or more snapshots of data stored over a period of time in the hybrid storage device, wherein the magnetic disk and the solid state disk are maintained within a single housing that implements the hybrid storage device, and wherein a selected snapshot stores information that allows recovery of data that is stored in the hybrid storage device at a selected point in time of the period of time;
receiving an input/output (I/O) command from the computational device;
determining, by an application that executes in software, firmware, or hardware maintained within the single housing that implements the hybrid storage device, a category of a plurality of categories to which the I/O command received from the computational device belongs, wherein the plurality of categories comprise writing to an unused block, writing to a used block, reading from an unused block, and reading from a used block, and wherein the used block is a block on which data has been written;
in response to determining by the application executing in the hybrid storage device the category to which the I/O command received from the computational device belongs, handling the I/O command by one of the magnetic disk and the solid state disk based on the determined category; and
in response to determining that an incremental snapshot stored in the solid state disk is to be merged with a first snapshot stored in the magnetic disk, all blocks in the incremental snapshot stored in the solid state disk are copied onto the magnetic disk to overwrite oldest blocks present in the magnetic disk, wherein:
management of snapshots is provided by a management software that resides in a hidden partition of the magnetic disk and is loaded prior to operating system startup by Extensible Firmware Interface (EFI) or Basic Input-Output System (BIOS), and once the management of snapshots is complete the operating system is loaded.

8. The hybrid storage device of claim 7, the operations further comprising:
 determining that a first snapshot taken at a first point in time exists on the magnetic disk and that a second snapshot at a second point in time is to be generated; and
 generating the second snapshot at the second point in time; and
 storing the second snapshot on the solid state disk, wherein the second snapshot stores changes that have taken place since the first snapshot taken at the first point in time.

9. The hybrid storage device of claim 8, wherein the handling of the I/O command by one of the magnetic disk and the solid state disk based on the determined category further comprises:
 in response to determining that the category is writing to an unused block, handling the I/O command via the magnetic disk; and
 in response to determining that the category is writing to a used block, handling the I/O command via the solid state disk.

10. The hybrid storage device of claim 8, wherein the handling of the I/O command by one of the magnetic disk and the solid state disk based on the determined category further comprises:
 in response to determining that the category is reading from a used block, performing:
 (i) determining whether the used block is on the magnetic disk or on the solid state disk;
 (ii) in response to determining that the used block is on the magnetic disk, handling the I/O command via the magnetic disk; and
 (iii) in response to determining that the used block is on the solid state disk, handling the I/O command via the solid state disk; and
 in response to determining that the category is reading from an unused block, returning a predetermined fixed response to the computational device.

11. The hybrid storage device of claim 7, wherein the EFI or the BIOS remains unmodified to support the management of snapshots.

12. The hybrid storage device of claim 11, wherein software that exists in the computational device to interact with the hybrid storage device remains unmodified to support the management of snapshots.

13. A computer program product, the computer program product comprising:
 a non-transitory computer readable storage medium having computer readable program code embodied therewith, the computer readable program code configured to perform operations, the operations comprising:
 maintaining one or more snapshots of data stored over a period of time in a hybrid storage device comprising a magnetic disk and a solid state disk, wherein the magnetic disk and the solid state disk are maintained within a single housing that implements the hybrid storage device, and wherein a selected snapshot stores information that allows recovery of data that is stored in the hybrid storage device at a selected point in time of the period of time;
 receiving, by the hybrid storage device, an input/output (I/O) command from a computational device;
 determining, by an application that executes in software, firmware, or hardware maintained within the single housing that implements the hybrid storage device, a category of a plurality of categories to which the I/O command received from the computational device belongs, wherein the plurality of categories comprise writing to an unused block, writing to a used block, reading from an unused block, and reading from a used block, and wherein the used block is a block on which data has been written;
 in response to determining by the application executing in the hybrid storage device the category to which the I/O command received from the computational device belongs, handling the I/O command by one of the magnetic disk and the solid state disk based on the determined category; and
 in response to determining that an incremental snapshot stored in the solid state disk is to be merged with a first snapshot stored in the magnetic disk, all blocks in the incremental snapshot stored in the solid state disk are copied onto the magnetic disk to overwrite oldest blocks present in the magnetic disk, wherein:
 management of snapshots is provided by a management software that resides in a hidden partition of the magnetic disk and is loaded prior to operating system startup by Extensible Firmware Interface or Basic Input-Output System, and once the management of snapshots is complete the operating system is loaded.

14. The computer program product of claim 13, the operations further comprising:
 determining that a first snapshot taken at a first point in time exists on the magnetic disk and that a second snapshot at a second point in time is to be generated; and
 generating the second snapshot at the second point in time; and
 storing the second snapshot on the solid state disk, wherein the second snapshot stores changes that have taken place since the first snapshot taken at the first point in time.

15. The computer program product of claim 14, wherein the handling of the I/O command by one of the magnetic disk and the solid state disk based on the determined category further comprises:
 in response to determining that the category is writing to an unused block, handling the I/O command via the magnetic disk; and
 in response to determining that the category is writing to a used block, handling the I/O command via the solid state disk.

16. The computer program product of claim 14, wherein the handling of the I/O command by one of the magnetic disk and the solid state disk based on the determined category further comprises:
 in response to determining that the category is reading from a used block, performing:
 (i) determining whether the used block is on the magnetic disk or on the solid state disk;
 (ii) in response to determining that the used block is on the magnetic disk, handling the I/O command via the magnetic disk; and
 (iii) in response to determining that the used block is on the solid state disk, handling the I/O command via the solid state disk; and
 in response to determining that the category is reading from an unused block, returning a predetermined fixed response to the computational device.

17. The computer program product of claim 13, wherein the EFI or the BIOS remains unmodified to support the management of snapshots.

18. The computer program product of claim 17, wherein software that exists in the computational device to interact with the hybrid storage device does remains unmodified to support the management of snapshots.

* * * * *